(No Model.) 2 Sheets—Sheet 1.
J. GIBBINS.
CLUTCH FOR SHAFTING.
No. 257,488. Patented May 9, 1882.
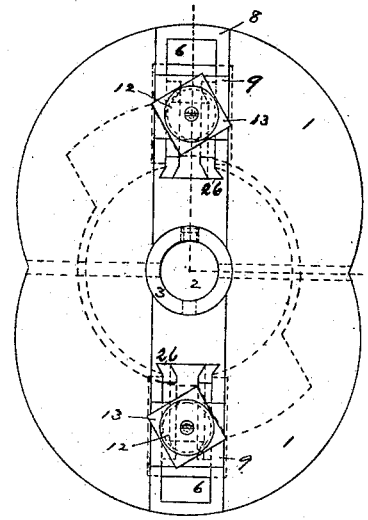
Fig. I.
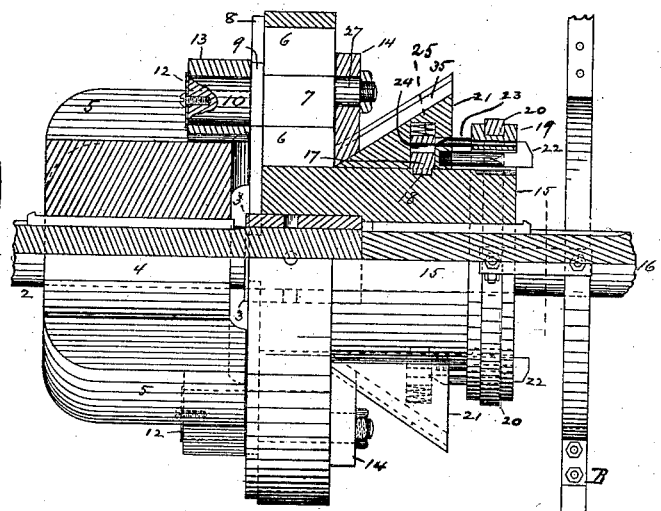
Fig. III.
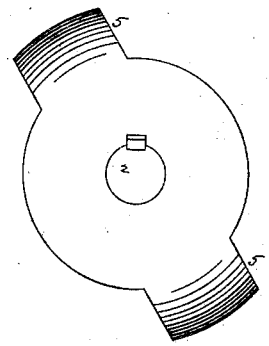
Fig. II.
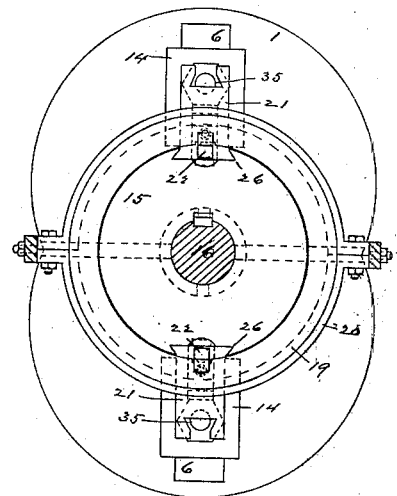
Fig. IV.
Witnesses.
Chas. H. Wood.
E. M. Bissell.
Inventor.
James Gibbins
By T. A. Lecuits,
his atty.

(No Model.)
2 Sheets—Sheet 2.
J. GIBBINS.
CLUTCH FOR SHAFTING.
No. 257,488. Patented May 9, 1882.
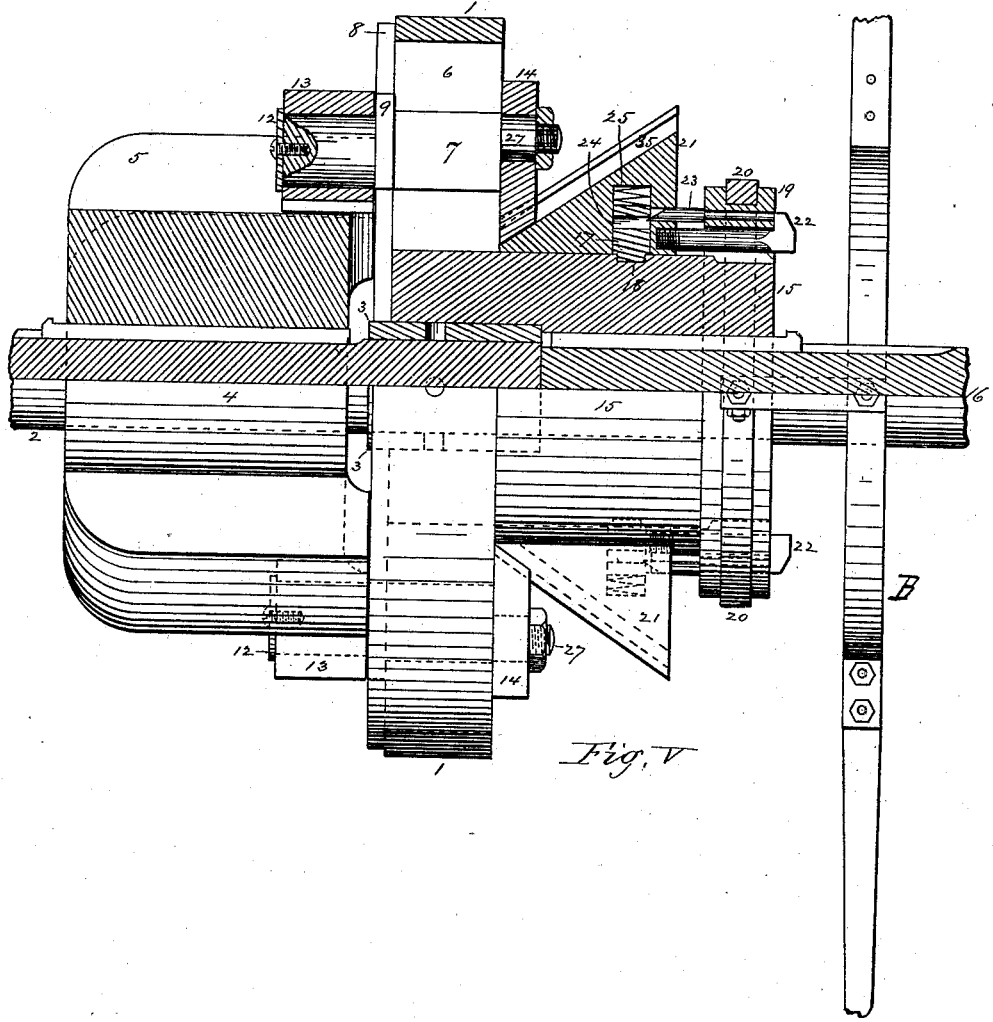
Fig. V
Witnesses.
Chas H. Wood
W. H. Paige
Inventor.
James Gibbins,
By T. Alcutis,
his Atty.

UNITED STATES PATENT OFFICE.

JAMES GIBBINS, OF SPRINGFIELD, MASSACHUSETTS.

CLUTCH FOR SHAFTING.

SPECIFICATION forming part of Letters Patent No. 257,488, dated May 9, 1882.

Application filed October 19, 1881. (No model.)

*To all whom it may concern:*

Be it known that I, JAMES GIBBINS, of Springfield, in the county of Hampden and State of Massachusetts, have invented a new and useful Improved Clutch for Shafting, of which the following is a specification and description.

The object of my invention is to disconnect one or more portions of a line of shafting from other portions—or, in other words, to release the main driving-power from any portion of a line of shafting—easily and quickly, and I accomplish this by the mechanism substantially as hereinafter described, and illustrated in the accompanying drawings, in which—

Figure I is a front end view of that portion of my invention which contains the movable part of the mechanism, and which is secured to the end of one portion of the shafting. Fig. II is an end view of the other portion, which is secured to the adjacent end of another portion of the same line of shafting. Fig. III is a half side view or elevation in its lower portion and a half longitudinal section in its upper portion of my invention, showing the two portions of the clutch as located when in operation and secured to the two adjacent ends of two separate pieces of shafting in the same line. Fig. IV is a rear end view of that portion of my invention which contains the movable parts of the mechanism; and Fig. V is a half side view in the lower portion and a half longitudinal section in its upper portion of my invention, showing the two parts of the clutch when in operation and secured to the two adjacent ends of two separate pieces of shafting in the same line on a scale one-third larger than the same view shown in Fig. III.

In the drawings, 2 represents one portion of a line of shafting, to which, near the end, is secured the tail-block, as 4, provided with the projecting lugs, as 5, one opposite the other; and 16 represents another piece of shafting in the same line, but disconnected from the piece 2, except through the medium of the clutch, and to which piece 16 is secured the head-block, as 15, which may be in the form of a cylinder keyed to the shaft 16, and the front end of this block is provided with a vertical plate, as 1, which may be of any desired form in its front view, and with a channel, as 8, made in its front face, and with two openings or slots, as 6, made in said channel entirely through the plate. The head-block 15 is provided with two longitudinal dovetail grooves or channels, as 26, one opposite the other, as shown clearly in Figs. I and IV, and extending substantially parallel with the shaft 16; and a collar, as 19, is fitted to the head-block 15, to slide freely to and fro thereon, with a strap, as 20, fitted to revolve freely within a circumferential groove made in the collar 19, with which strap a shipper, as B, is connected. A wedge, as 21, is dovetailed into each groove 26 in the head-block, so as to slide freely in the groove, and a threaded key-bolt, 22, extends through a hole or opening in the collar 19, and is turned snugly into a threaded hole in the large end of each wedge, as shown clearly in section in Fig. III, the bolt being smaller than the hole through the collar, so that said collar may be moved in freely independently of the bolt, but the bolt-head serving as a catch to engage with the collar in its movement outward. Each wedge 21 is recessed, as at 25, and a pin, as 17, is inserted in said recess, with a spring inside to force the pin outward into engagement with a recess, as 18, made in the block 15, by which the wedge is held firmly in its outward position, as shown clearly in Fig. III. This pin 17 is provided with a small hole, as 24, made at right angles to its length, and the end of a small stud, as 23, projecting inward from the collar 19, is made tapered to enter said hole in the pin and move the pin outward and out of engagement with the recess in the block when the collar is moved in a little.

A sliding pin, as 7, is fitted to slide in and extends through each slot or opening 6 in the vertical plate 1, and is preferably provided with a rectangular shoulder, as 9, fitted to slide to and fro in the channel 8, made in the face of the said plate 1. That portion of this sliding pin 7 which projects outward from the face of the flange 1 is made cylindrical, and a prismatic piece, as 13, is fitted and secured to revolve thereon by a washer and screw, as 12, at the extreme outer end. A guide-piece, as 14, is secured to the rear and opposite end of the sliding pin 7, preferably by a nut screwed thereon, the inner end of said guide-piece being provided with a dovetail or other equivalent tongue or groove, to engage with a correspondingly-formed groove or tongue made on the outer and inclined side of the sliding wedge 21, so that when the wedge is moved into the opening 6 in the vertical plate the guide 14 and the sliding pin 7 secured thereto will be moved outward in a direction at right angles to the shaft 16, and if the wedge is moved back again and out of the opening 6 the guide 14 and sliding pin secured thereto will be moved inward toward the shaft.

The head-block, as 15, is counterbored at the outer end at its central portion, or is fitted with a bushing, as 3, arranged to revolve freely within its recess in the head-block, the shaft 16 only extending into the head-block to the inner end of the bushing, and the other shaft, as 2, extends through the tail-block, as 4, and has a bearing within the bushing 3. This arrangement of bushing in the head-block, with the end of the shaft 2 extending through the tail-block, is not an essential feature of the clutch; but I prefer to so construct it, as the two parts of the clutch and the two shafts are then sure to be on the same axial line and are firmly secured to move together.

The operation of my invention is as follows: Suppose the two parts of the clutch—the tail-block, as 4, and the head-block, as 15—are firmly secured respectively to the two shafts 2 and 16, which are not otherwise connected. Then, if power be applied to either shaft to turn the other, the parts would all be in position as shown in Fig. III, the wedges 21 having been drawn back by moving the collar 19 back against the head of the bolt 22 by means of the shipper B and strap 20, encircling the collar, until the pins 17 engage in the recesses 18 in the head-block. When in this position the sliding pins 7 are drawn in toward the shaft, and if power is applied to the shaft 16, as they revolve they come in contact with the lugs 5 of the tail-block 4, secured to the shaft 2, and cause the latter to revolve also. Whether the two parts of the clutch are connected or not, as the shipper is hung to some permanent part of the building or fixtures, the head-block and the collar 19 are free to revolve, the strap or ring 20 which encircles the collar remaining stationary with the shipper.

Suppose the clutch mechanism to be in position as shown in Fig. III in some large manufacturing establishment and some accident should happen in that portion of the building in which the machinery was carried by the shafting 2, requiring the immediate stoppage of that part of the machinery. Instead of being obliged to go or send to a distant part of the establishment where the power was applied, one of the operatives could merely move the shipper B to one side, and the power would be removed from, say, the shaft 2. In doing this, as the shipper was moved the collar would be moved toward the wedges 21, thereby forcing the inclined end of the stud 23 into the hole in each pin 17, and thereby forcing each pin outward until the wedges were unlocked. As the inward movement of the collar continued it would come into contact with the wedges 21 and force them along in their grooves 26 in the head-block and into the openings 6 through the plate of the head-block, the guides 14 being thereby forced up the inclined sides of the wedges, and forcing the sliding pins 7 outward out of contact with the lugs 5 on the tail-block, and the latter being thus disconnected from the head-block, the connection between the two shafts 2 and 16 would be severed, and the one having no power applied and the machinery connected therewith would immediately stop, and the other shaft, as 16, could be afterward stopped at leisure. Before starting again it would only be necessary to move the shipper back again, moving the collar 19 backward against the heads of the bolts 22 and moving the latter backward also, drawing the wedges 21 back and forcing the guides 14 and sliding pins 7 connected therewith inward into position to engage with the lugs 5 of the tail-block. When the power was again applied, both shafts, 2 and 16, being then connected, they would both be operated upon by the power and both move together as before.

Oiling-holes may be made in the flange 1, as shown in dotted lines in Fig. I, and as shown also in Fig. III, leading into the bushing 3, and oiling-holes may also be made through the bushing, so that both the interior and the exterior of the bushing may be well oiled, and as the bushing is free to revolve there is no liability of any binding between the bushing and its bearings. By this means any portion of a line of shafting may be stopped instantly in case of any accident, and much trouble and delay avoided; and the clutch is substantial and strong, and is not liable to get out of order.

It will be seen that to uncouple or disconnect the shafting the shipper is moved to force the collar inward to unlock the wedges and to move the latter inward, also to throw the sliding pins 7 outward, and as the head-block 15, with its plate 1 and sliding pins 7, are revolving very rapidly, as soon as the wedges are unlocked by the inclined studs 23 the centrifugal force operates to assist in throwing the said pins 7 outward, and, however firmly the said pins may be pressed against the lugs of the tail-block, this tendency of the centrifugal force to throw the said pins apart renders it comparatively easy to uncouple the shafting when desired.

It is of course evident that it is not essential to the successful operation of the invention that the prismatic pieces 13 should be fitted to revolve upon the projecting ends of the sliding pins 7, as those ends might be left cylindrical to engage with the lugs of the tail-block; but I prefer to add the prismatic pieces to aid somewhat in lessening the shock and to secure a large bearing-surface between the sliding pins and the lugs.

It is evident that for light purposes the tail-block, instead of being made in the form of a block with projecting lugs, may consist of merely a cross bar or piece screwed or otherwise secured to the shaft, and extending at right angles thereto, to engage with the sliding pins of the head-block.

Having thus described my invention, what I claim as new is—

1. The combination, in a clutch for coupling and uncoupling shafting, of a tail-block provided with radial projections and adapted to be keyed fast to one end of a line of shafting, a head-block adapted to be keyed fast to the adjacent end of separate shafting in the same line, a plate made upon or secured to said head-block at right angles to its axis and provided with radial openings, a sliding pin secured in each said opening, and mechanism to slide the said pins to and fro, each in its respective opening, to cause the pins to engage with the lugs on said tail-block in a lateral direction, or to disengage them from said lugs, substantially as described.

2. The combination, in a clutch for coupling and uncoupling shafting, of a tail-block provided with radial projections and adapted to be secured fast to one end of a line of shafting, a stationary head-block adapted to be keyed fast to the adjacent end of separate shafting in the same line, a plate made upon or secured to said head-block at right angles to its axis and provided with radial openings, a sliding pin provided with a guide secured in each said opening, and sliding wedges having a movement in and independent of the stationary head-block and parallel with the shaft to operate the sliding pins, substantially as described.

3. In a clutch for coupling and uncoupling two separate and independent shafts, the combination of the sliding wedges, the recessed spring locking-pins located therein, and an operating-collar provided with inclined studs to engage with said pins, whereby said pins are first moved outward and the wedges unlocked, and the wedges moved to operate the sliding pins of the clutch by a single movement of said collar, substantially as described.

JAMES GIBBINS.

Witnesses:
T. A. CURTIS,
E. M. BISSELL.